United States Patent [19]

Smith et al.

[11] Patent Number: 4,854,069
[45] Date of Patent: Aug. 8, 1989

[54] FISHING POLE SUPPORT APPARATUS

[76] Inventors: Ellis D. Smith, 217 Sargent St.; Tyrone Smith, Jr., P.O. Box 321, both of Kendallville, Ind. 46755

[21] Appl. No.: 215,606

[22] Filed: Jul. 6, 1988

[51] Int. Cl.⁴ .................. A01K 97/10; A01K 87/04; A47B 91/00
[52] U.S. Cl. ..................................... 43/21.2; 43/24; 43/25; 248/538; 248/688
[58] Field of Search .............. 43/15, 17, 21.2, 25, 43/24; 248/165, 359 E, 432, 538, 540, 541

[56] References Cited

U.S. PATENT DOCUMENTS

| | | |
|---|---|---|
| 219,970 | 2/1971 | Salzmann ........................ D22/22 |
| 2,899,769 | 8/1959 | Niles ............................... 43/21.2 |
| 3,484,066 | 12/1969 | Aunspaugh ...................... 43/21.2 |
| 3,530,611 | 9/1970 | Britt ................................ 43/17 |
| 4,261,128 | 4/1981 | Dobbins ........................... 43/21.2 |
| 4,479,628 | 10/1984 | Albright .......................... 43/21.2 |
| 4,550,520 | 11/1985 | Bogue .............................. 43/21.2 |

FOREIGN PATENT DOCUMENTS 8300363 8/1984 Netherlands .
2058557 4/1981 United Kingdom ............... 43/21.2
2119612 11/1983 United Kingdom .

*Primary Examiner*—Kuang Y. Lin
*Assistant Examiner*—William Scott Andes
*Attorney, Agent, or Firm*—George Pappas

[57] ABSTRACT

A fishing pole support apparatus having an operative position and a storage position is attached to a fishing pole. The fishing pole is frictionally clamped in a channel between the body and a cover plate. Two legs are detachably attached to the body and, in the operative position, form a tripod with the fishing pole so as to retain the fishing pole in an inclined position. In the storage position, the legs are selectively clamped and supported parallel to the fishing pole by two clamps attached to the body. The legs can be made up of a plurality of leg sections detachably attachable to one another.

29 Claims, 3 Drawing Sheets

FISHING POLE SUPPORT APPARATUS

BACKGROUND OF THE INVENTION

This invention relates generally to a fishing pole support apparatus having an operative position and a storage position. In its operative position, the apparatus supports the fishing pole in an upwardly pointing inclined position ready for grasping and reeling. In its storage position, the apparatus is attached to the fishing pole and the legs thereof are situated compactly substantially parallel next to the fishing pole.

Most non-commercial fishing, in general, is done on boats, on the banks of lakes, rivers and oceans, and on piers. Ice fishing is generally done on top of the ice of a frozen body of water such as a lake or a river and through a hole in the ice. In most instances, the fishing line is cast out or placed in the water and the fisherman waits for a fish to become hooked and, thereafter, the fish is reeled in. The fisherman knows that a fish has been hooked by visually seeing a bobber attached to the fishing line, be pulled under water, or by feeling the fishing line going taught or being pulled. During the waiting period, or when the fishing line is not being cast or when a fish is not being reeled in, the fisherman must either hold the fishing pole in his hands or set it down on the ground, boat or pier. Holding the fishing pole in one's hands often times becomes tiresome and, further, the fisherman may also want to place the fishing pole down so as to eat a sandwich, get a drink or, in general, take a break. Some fisherman enjoy fishing with more than one fishing pole at one time and are, thus, generally forced to put at least one fishing pole down on the ground, pier or boat. Further yet, when ice fishing, it is desirable to put the fishing pole down so that the fisherman can warm up his hands in his pockets or next to a heater.

Unfortunately, placing the fishing pole on the ground, especially when one is fishing on a bank of a body of water, causes the fishing pole and reel to be soiled and, often times, dirt may enter the reel mechanism and damage or prevent the reel from working properly. When ice fishing in a heated tent, placing the fishing pole on the ice, causes it to become substantially cold so that the fishing pole becomes undesirably cold when the fisherman picks it up. Further, when fishing without a bobber, for example, when "bottom fishing", it is undesirable to place the fishing pole on the ground because a strike or a hit, such as when a fish takes the bait, is not readily visible. Further yet, it is quite possible, when a fishing pole is merely placed on the ground, pier or boat, for a larger fish that becomes hooked to simply pull the entire fishing pole into the water if the fisherman is not nearby or quick enough so as to grab the fishing pole.

In the past, Y-shaped twigs and commercial Y-shaped stakes have been used by driving the same into the ground and resting the fishing pole on the upper portion of the Y. However, these Y-shaped twigs and stakes are undesirable because they cannot be used on gravel, ice or concrete banks and on piers and boats. Further, although it is desirable to place the fishing pole at a particular inclined angle so as to maximize the sensitivity of the pole and to be able to more readily see the pole bending when a fish strikes, this cannot be accomplished through the use of a Y-shaped twig or stake. This is because the height of the Y-shaped twig or stake varies by the length that is driven into the ground and because the fishing pole itself generally readily slides when resting on the Y. It is also difficult to use Y-shaped twigs and stakes when fishing on a bank because moving to another spot requires pulling the twigs or stakes out of the ground and, thereafter, again forcing them into the ground at the new spot or leaving the twig in the ground and locating another Y-shaped twig and forcing it into the ground at the new spot. Further yet, the use of Y-shaped twigs and stakes is oftentimes undesirable because the fishing pole resting on the Y rotates on its axis and the fishing reel faces downwardly while the fishing pole is resting on the Y. Thereafter, when a fish strikes, the fisherman not only must quickly pick up the pole but, also, must turn the fishing pole over so as to make the fishing reel handle accessible and so that the fishing line can start to be reeled in.

Y-shaped spikes and other devices for supporting a fishing pole such as those described in U.S. Pat. Nos. 3,530,611, 4,261,128, 4,479,628 and 4,550,520 have the drawback of not being easily storable. In general, these devices are bulky and do not readily fit within a tackle box. Further, even if one or more of these devices are small enough to be placed in a tackle box, this is undesirable as it takes up room forcing the fisherman to either carry a tremendously large tackle box or reduce the amount of fishing gear carried in the tackle box.

Accordingly, here is a need for a fishing pole support apparatus that is capable of retaining a fishing pole during use in an inclined position at a substantially selected angle. The fishing pole support apparatus must be capable of use on banks comprising of dirt, gravel or concrete, on ice, on piers, and also on boats. The fishing pole angle of incline, once set as desired by the fisherman, should be capable of being retained as set. The apparatus should be readily movable from one spot to another without having to pull it out of or drive it back into the ground. The apparatus should also prevent the fishing pole from twisting on its axis and be capable of retaining the reel upright so that it is readily accessible for immediate reach and for reeling in the fishing line upon the occurrence of a strike. The apparatus should, in general, help to prevent a fish from pulling the fishing pole and apparatus into the water and, in general, prevent dirt from coming in contact with the reel or from soiling the fishing pole and should allow the fisherman to fish with numerous poles and to put the pole down and take a break. Further, the fishing pole support apparatus should be readily storable without taking a large amount of space and, without having to be carried separately by the fisherman or having to be stored in a tackle box. The apparatus should also be easily installable on a fishing pole and should be capable of easily being placed in its operative position and in its storage position. Further yet, the fishing pole support apparatus must be designed so as to be generally inexpensive to manufacture and, yet, reliable and rugged for use.

SUMMARY OF THE INVENTION

The fishing pole support apparatus, according to the present invention, is designed to overcome the above-discussed disadvantages associated with prior fishing pole holders or support apparatuses and to fill the above-discussed needs associated therewith.

The fishing pole support apparatus, according to the present invention, has an operative position and a storage position. A body has a semicircular groove and, a cover plate also having a semicircular groove is attached to the body with the grooves being aligned and facing each other and forming a channel. The fishing pole is received within the channel and the body is frictionally retained thereon by tightening the cover plate upon the body and clamping the fishing pole within the channel.

The apparatus body has two threaded holes and, two legs each having an attachment end that is threaded are selectively threadably received in the respective threaded holes. Thus, when the two legs are threadably received in the threaded holes, the two legs are rigidly attached to the apparatus body and the apparatus is in its operative position. The legs and the fishing pole form a tripod and, the fishing pole is retained at a selected angle of incline and with the reel situated generally upwardly.

The fishing pole support apparatus body includes two clamps, each of which is adapted to selectively support and hold one of the legs substantially parallel to the fishing pole. The clamps include two arms connected to the body and extending outwardly therefrom and forming a groove therebetween whereat the legs are selectively received and frictionally retained in their respective storage positions.

The legs can comprise of a plurality of leg sections, each detachably attachable to one another, with a threaded portion at the end of a leg section received in a threaded hole at the end of another leg section. A cap made of rubber is received at one end of the legs opposite the end whereat the legs are attached to the body and aid in frictionally retaining the apparatus and the fishing pole from being pulled into the water by a fish.

A fishing line guide insert having a ring portion attached to a rod is provided for insertion in a bore at the end of a separable fishing pole and for guiding the fishing line therethrough. In this fashion, the fishing pole support apparatus can be attached to a separable fishing pole and the guide insert received at the end of the portion of the separable fishing pole to which the reel is attached. Thus, a shorter fishing pole is provided adapted for use in ice fishing.

In one form thereof, the present invention is directed to a fishing pole support apparatus including a body and a first clamp means for attaching the body to a fishing pole. Two legs are provided and are detachably attached to the body. A second clamp means attached to the body is provided for selectively clamping and supporting the legs on the body when the legs are detached from the body.

In one form thereof, the present invention is directed to a fishing pole support apparatus having an operative position and a storage position. The apparatus includes a body and a first clamp means for attaching the body to a fishing pole. Two legs are provided and are detachably attached to the body. The apparatus is in its operative position and the legs and the fishing pole form a tripod when the legs are attached to the body. A second clamp means is attached to the body and is provided for selectively clamping and supporting the legs on the body when the legs are detached therefrom. The apparatus is in its storage position when the legs are clamped and supported on the body by the second clamp means.

BRIEF DESCRIPTION OF THE DRAWINGS

The above-mentioned and other features and objects of this invention and the manner of obtaining them will become apparent and the invention itself will be better understood by reference to the following description of an embodiment of the invention taken in conjunction with the accompanying drawings wherein.

Corresponding reference characters indicate corresponding parts throughout the several views of the drawings.

The exemplifications set out herein illustrate a preferred embodiment of the invention in one form thereof and such exemplifications are not to be construed as limiting the scope of the disclosure or the scope of the invention in any manner.

DETAILED DESCRIPTION OF A SPECIFIC EMBODIMENT

Figure 1:
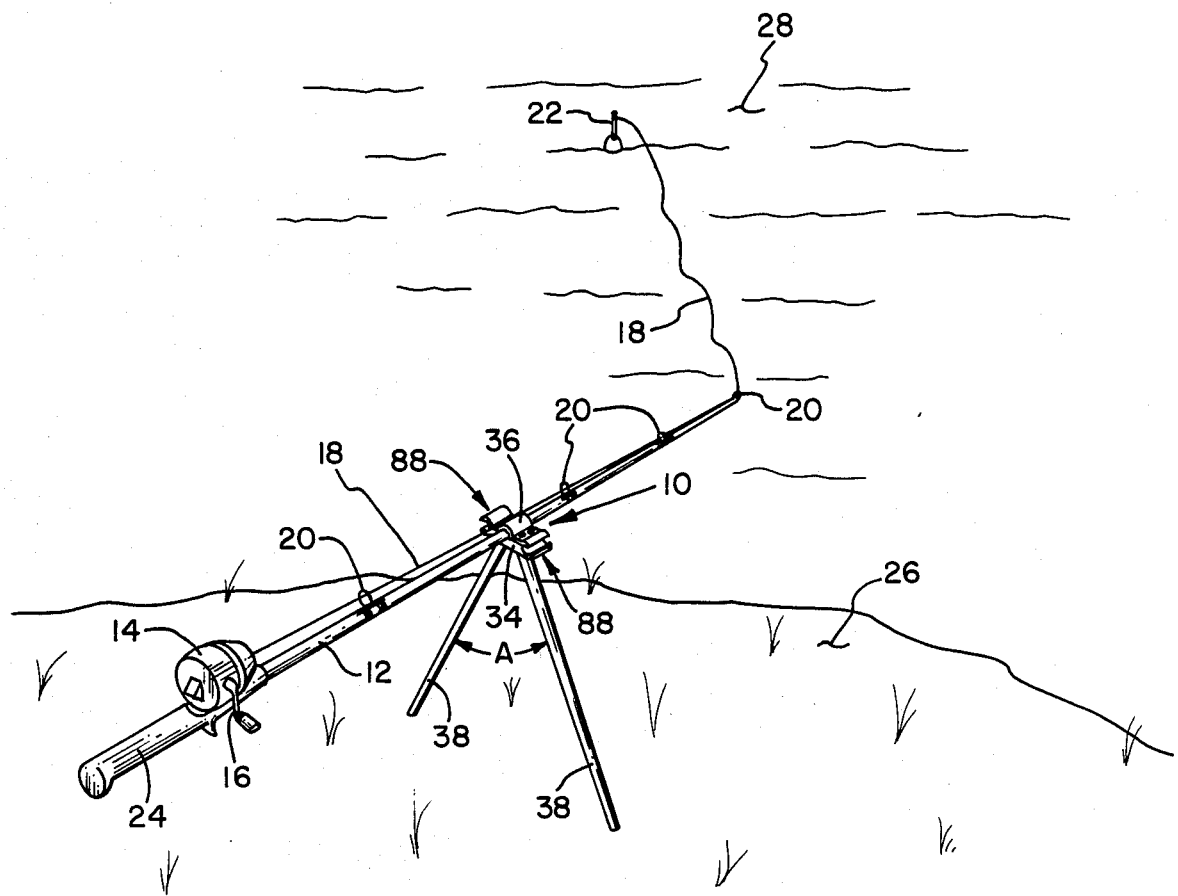
FIG. 1 is a perspective view of the fishing pole support apparatus according to the present invention shown attached to a fishing pole and in its operative position.
Figure 8:
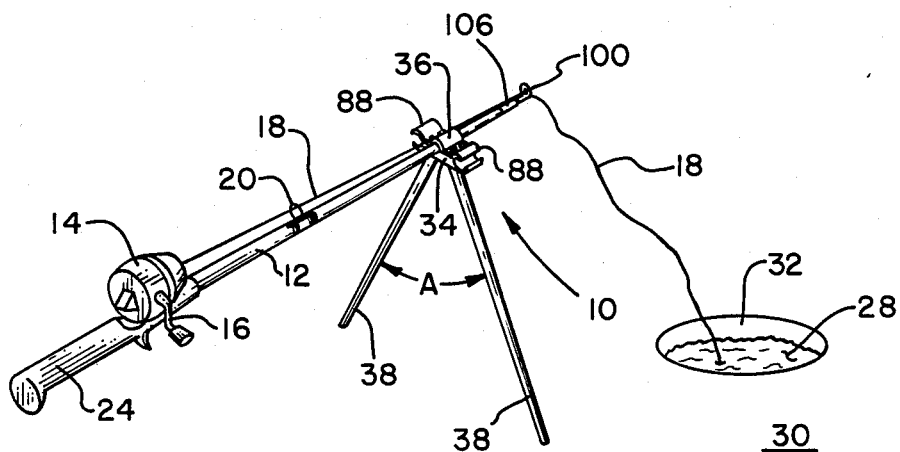
FIG. 8 is a perspective view of a fishing pole support apparatus, according to the present invention, shown attached to a fishing pole in its operative position and in use with a fishing line guide insert for use in ice fishing; and, FIG. 9 is a side elevational view of the fishing line guide insert shown in FIG. 8.

As shown in the drawings, a specific embodiment of the fishing pole support apparatus is generally indicated as 10. Fishing pole support apparatus 10 is adapted to be attached to a fishing pole 12 with a clamp means and, in its operative position, form a tripod with fishing pole 12 as shown in FIGS. 1 and 8. Fishing pole 12 includes a reel 14 attached thereto and having a reel handle 16. Fishing line 18, adapted to be reeled in and out of reel 14 is guided through eyelets 20 and, at the end thereof, may have a bobber 22, hooks and sinkers (not shown) attached thereto. Fishing pole 12 further includes a handle 24 whereat the fishing pole is grasped during casting and reeling in of fishing line 18.

In operation, fishing pole support apparatus 10 forms a tripod with handle 24 of fishing pole 12 so as to hold fishing pole 12 at an incline as shown in FIGS. 1 and 8. As shown, the apparatus 10 may be used to support pole 12 on a bank 26 of a body of water 28 or on ice 30 wherethrough a hole 32 is drilled so as to obtain access to water 28 for ice fishing. As can be appreciated and described herein, fishing pole support apparatus 10, in conjunction with fishing pole 12, may be used on numerous surfaces, such as dirt, gravel, concrete, on piers, boats, etc.

Fishing pole support apparatus 10 generally includes a body 34, cover plate 36 and two legs 38. Body 34 is substantially rectangular-shaped and has a semi-circular groove 40 extending downwardly from upper face area 42. Body sides 44 extend downwardly from face areas 42 to bottom face area 46. Four holes 48 extend downwardly from face 42 into body 34.

Cover plate 36, in general, includes a raised portion 50 integrally connected on two sides thereof to lands 52. Lands 52 have a bottom flat surface 54 and an upper flat surface 56. A screw means is provided for detachably fastening cover plate 36 to body 34. Self-tapping pan head screws 60 are adapted to be received through holes 58 in lands 52 of cover plate 36 and threadably engage the sides of respective holes 48. In this regard, when cover plate 36 is fastened to body 34, bottom flat surfaces 54 of cover plate 36 face the upper face areas 42 of body 34 and holes 58 are substantially axially aligned with holes 48.

Raised portion 50 of cover plate 34 includes an exterior curved portion 62 and an interior semicircular groove 64. When cover plate 34 is fastened to body 34 as described hereinabove, semicircular groove 64 of cover plate 34 and semicircular groove 40 of body 34 are substantially axially aligned and situated opposite one another and form a channel wherein fishing pole 12 is received. This channel is preferably approximately three-eighths of one inch in diameter so as to accommodate most fresh water fishing poles. Because most fishing poles taper as they extend away from the handle and reel, there is generally at least one location along the fishing pole whereat the fishing pole can be clamped in the channel between cover plate 36 and body 34 and apparatus 10 frictionally attached and retained. So as to further aid this frictional attachment and to, on occasion, accommodate thinner diameter fishing poles, a small quantity of tape may be wrapped around the fishing pole 12. Thereafter, the taped portion may be placed in the channel formed of semicircular grooves 40 and 64 and, the cover plate 36 attached to body 34 through the use of the screw means as would normally be done without the use of tape. However, the use of tape aids the frictional attachment of the fishing pole support apparatus 10 on fishing pole 12.

Figure 3:
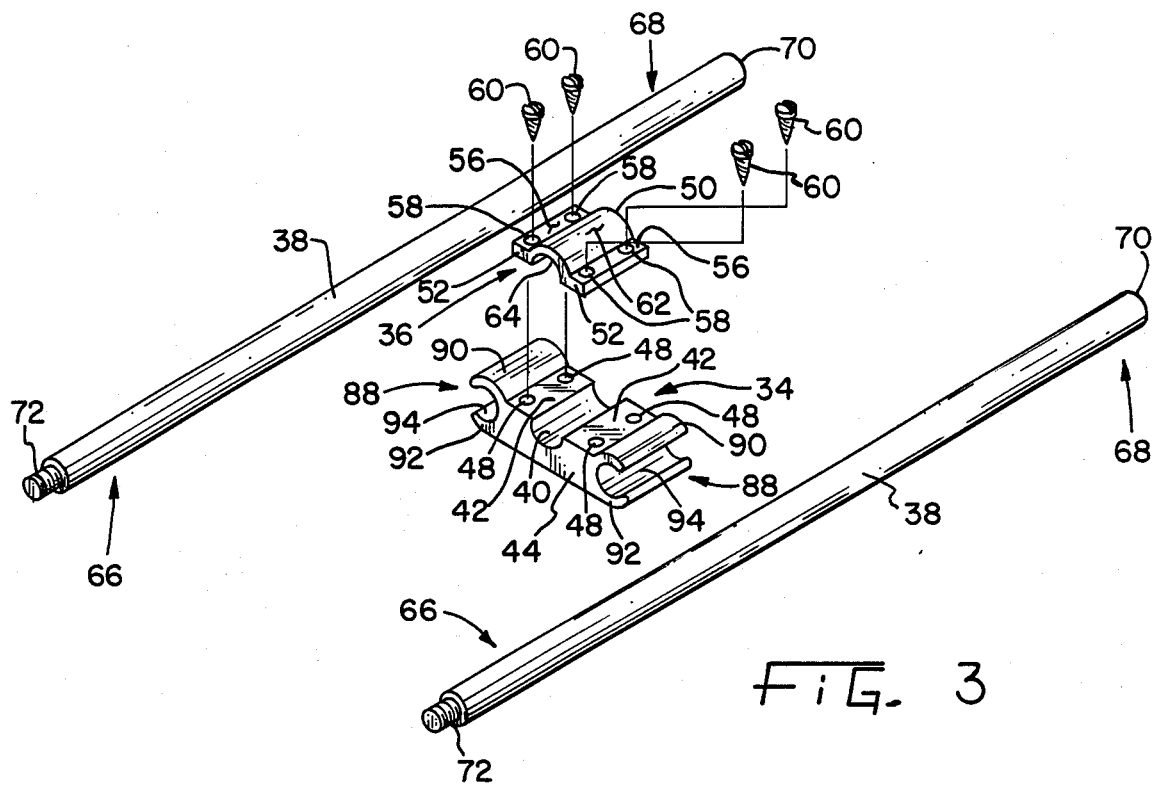
FIG. 3 is a perspective exploded view of the fishing pole support apparatus shown in FIG. 2.

As more clearly shown in FIG. 3, legs 38 have an attachment end 66 and a ground contacting end 68. Legs 38 are rounded as shown at 70 so as to substantially increase the frictional grip on the particular surface upon which the fishing pole support apparatus 10 is being used. Rounded ends 70 further prevent scratching the surface upon which it is being used such as a fiberglass boat and, are easier to clean when used on dirt or somewhat muddy surfaces. The other end of legs 38, at attachment end 66, include a threaded portion 72 which is adapted to be threadably received in respective threaded holes 74 extending at an angle upwardly into body 34 from bottom face area 46.

Figure 4:
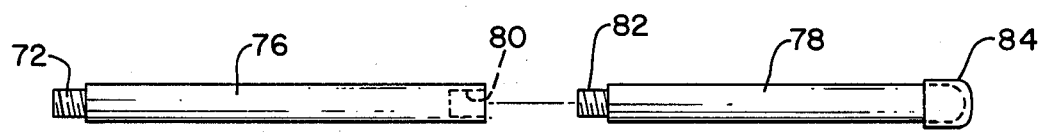
FIG. 4 is an exploded view of a second embodiment of the fishing pole support apparatus legs wherein the legs comprise a plurality of leg sections.

In a second embodiment, as shown in FIG. 4, a leg section 76 and a leg section 78 are detachably attachable to one another so as to form a longer leg such as leg 38 shown in FIG. 3. Leg section 76 includes a threaded portion 72 adapted to threadably be received in threaded holes 74. A thread means is provided for selectively detachably attaching the leg sections 76 and 78 together. This thread means includes a threaded hole 80 at the other end of leg sections 76 and a threaded portion 82 at one end of leg section 78 adapted to be threadably received within threaded hole 80 of leg section 76. At the other end of leg section 78, a cap 84 made of rubber or other suitable material, is received over the end of leg section 78. Cap 84 further aids in increasing the frictional stability of the fishing pole support apparatus 10 and to prevent scratching of surfaces upon which the fishing pole support apparatus is placed. It should also be noted that cap 84 can be used with leg 38 at ground contacting end 68 over rounded portion 70.

As described hereinabove, legs 38 or the plurality of leg sections forming the legs include a threaded portion 72 that is adapted to be detachably attached within threaded holes 74. Further, a counterbore portion 86 is provided outwardly from threaded hole 74 wherein a portion of legs 38 is received. It should be noted that threaded holes 74 and respective counterbore portions 86 of the fishing pole support apparatus 10 should be at an angle less than 160 degrees from one another and preferably at an angle of 120 degrees from one another. Thus, legs 38, as shown in FIGS. 1 and 8, extend out of body 34 at an angle A which is less than 160 degrees and preferably 120 degrees.

Figure 6:
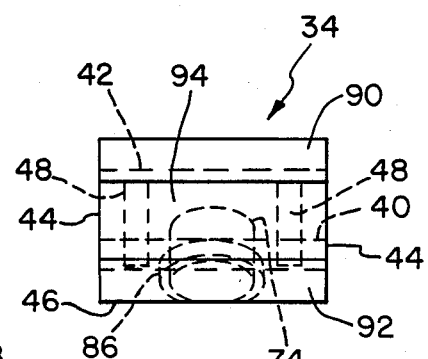
FIG. 6 is a side elevational view of the fishing pole support apparatus body shown in FIG. 3.
Figure 7:
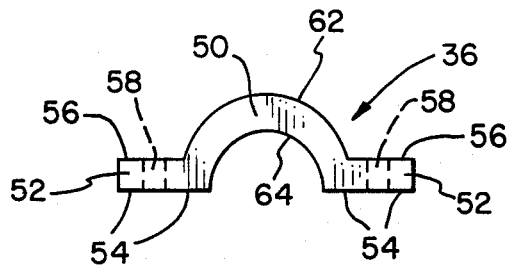
FIG. 7 is a front elevational view of the fishing pole support apparatus cover plate shown in FIG. 3.

As shown in FIG. 6, threaded holes 74 and respectively counterbore portions 86 are situated substantially perpendicular to the longitudinal channel formed by semicircular portions 40 and 64. Thus, legs 38 extend substantially perpendicularly outwardly from fishing pole 12 received in the channel. It should also be noted that legs 38 should be less than 14 inches in length and preferably approximately 12 inches in length for proper operation.

Figure 2:
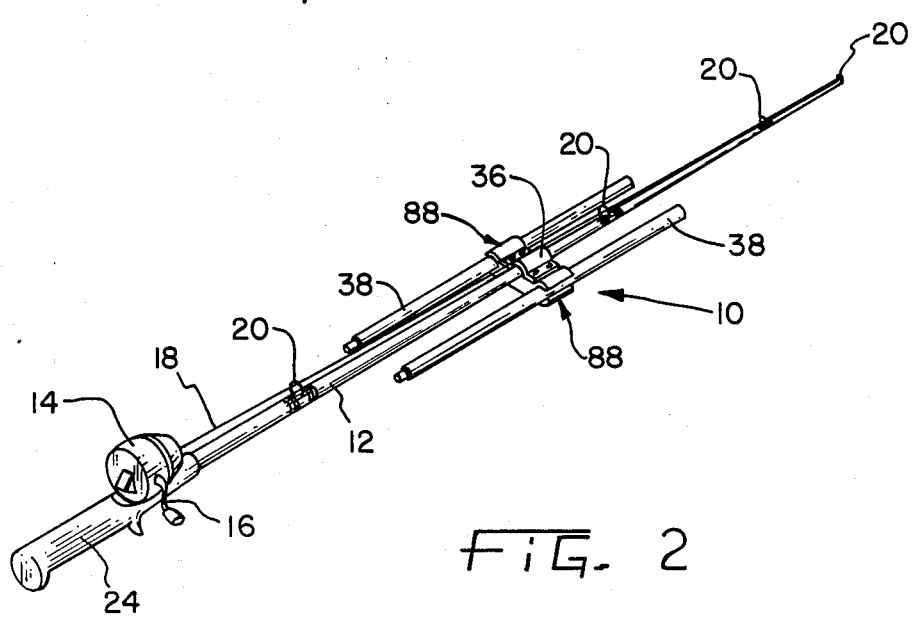
FIG. 2 is a perspective view of the fishing pole support apparatus shown in FIG. 1 and in its storage position.
Figure 5:
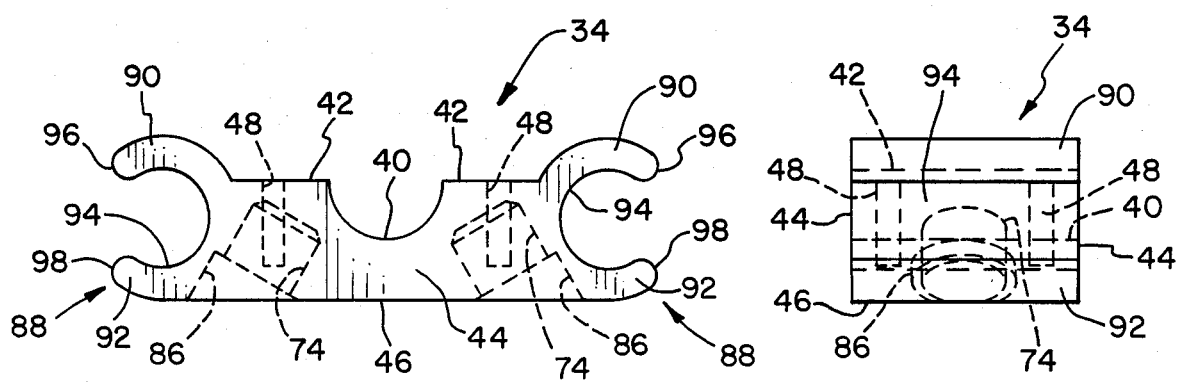
FIG. 5 is a front elevational view of the fishing pole support apparatus body shown in FIG. 3.

As shown in FIG. 2, when the fishing pole support apparatus is in its storage position, legs 38 are clamped and supported on body 34 substantially parallel to fishing pole 12 through the use of a second clam means attached to the body for selectively clamping and supporting the legs 38 on body 34. Two clamps generally designated as 88 are provided, each of which include an upper arm 90 and a lower arm 92. Arms 90 and 92 are integrally connected to body 34 and extend outwardly therefrom forming an elongate semicircular groove 94 therebetween. The ends 96 of arms 90 and the ends 98 of arms 92 are rounded, as more clearly shown in FIGS. 3 and 5. Ends 96 and 98 extend substantially parallel to one another and are apart from one another at a distance less than the diameter of elongate semicircular groove 94. Thus, to place the legs 38 in their respective storage positions, legs 38 are pressed into clamps 88 at first pushing arm ends 96 and 98 apart from one another allowing legs 38 to enter semicircular grooves 94. When legs 38 are within grooves 94, arms 90 and 92 snap back over and around legs 38 and frictionally hold legs 38 within grooves 94. In this regard, the diameter of semicircular grooves 94 is such that when legs 38 are received therein, they are frictionally held and prevented from slipping axially or out of grooves 94. Further, arms 90 and 92 are of the proper thickness and distance from one another and made of a semi-rigid material such that they will flex as necessary to allow arms 38 to be received within grooves 94 and yet snap back therearound to hold the same therein. Preferably, body 34, cover plate 36 and legs 38 are made of a fiberglass-filled plastic, or a plastic known as LEXAN and are injection molded.

Figure 9:
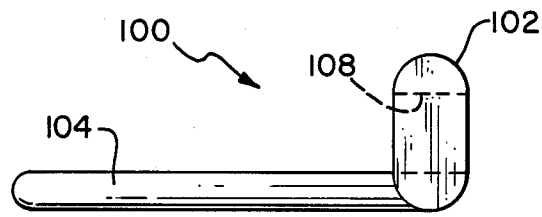

As shown in FIGS. 8 and 9, a fishing line guide insert 100 is provided for converting a common fishing pole 12 for use in ice fishing. Guide insert 100 includes a ring portion 102 attached to a rod portion 104. Rod portion 104 is operative to be inserted and frictionally held in a bore 106 at the end of fishing pole 12. Bore 106 normally receives an end portion of fishing pole 12. However, here the end portion of fishing pole 12 has been removed from bore 106 and rod portion 104 of guide insert 100 has been received instead therein. Ring portion 102 includes an annular opening 108 wherethrough fishing line 18 is received and guided.

As can be appreciated, the fishing pole support apparatus 10 has an operative position and a storage position. In its operative position, as shown in FIGS. 1 and 8, whereat legs 38 have been threadably received in threaded holes 74, a tripod is formed with fishing pole 12. Fishing pole 12 is held at an inclined angle that is selectively obtained by attaching the apparatus at a particular axial location along fishing pole 12. Fishing pole 12 is also prevented from pivoting about its axis and, thus, reel 14 is held, for example, upwardly as shown in FIGS. 1 and 8, and prevented from coming in contact with the ground. In its storage position, as shown in FIG. 2, legs 38 are snapped into and held by clamps 88 substantially parallel to fishing pole 12. In this fashion, fishing pole support apparatus 10 is always ready for use and need not be stored in a tackle box or elsewhere.

While the invention has been described as having specific embodiments, it will be understood that it is capable of further modifications. This application is, therefore, intended to cover any variations, uses, or adaptations of the invention following the general principle thereof and including such departures from the present disclosure as come within known or customary practice in the art to which this invention pertains and fall within the limits of the appended claims.

What is claimed is:

1. A fishing pole support apparatus comprising:
   a body;
   first clamp means for attaching said body to a fishing pole;
   two legs detachably attached to said body; and,
   second clamp means attached to said body for selectively clamping and supporting said legs on said body when said legs are detached from said body.

2. The fishing pole support apparatus of claim 1 wherein said first clamp means includes a cover plate detachably fastened to said body, a channel being situated between said cover plate and said body wherein the fishing pole is received and is frictionally attached and retained.

3. The fishing pole support apparatus of claim 2 wherein said body and said cover plate each include a semi-circular groove, said grooves being aligned and situated opposite one another and forming said channel wherein said fishing pole is received.

4. The fishing pole support apparatus of claim 2 further comprising screw means for detachably fastening said cover plate to said body.

5. The fishing pole support apparatus of claim 4 wherein said screw means includes a plurality of screws received through respective holes in said cover plate and threadably engaged in respective aligned holes in said body.

6. The fishing pole support apparatus of claim 1 wherein said detachable connection of said legs to said body includes two threaded holes in said body, said legs each having an attachment end, said attachment ends being threaded so as to be selectively threadably received in said respective threaded holes.

7. The fishing pole support apparatus of claim 6 wherein said threaded holes include a counterbore portion and wherein a portion of said legs past said threaded portion is received in said counterbore portion.

8. The fishing pole support apparatus of claim 1 wherein said legs are detachably attached to said body at an angle less than 160 degrees from one another.

9. The fishing pole support apparatus of claim 8 wherein said legs are detachably attached to said body substantially perpendicular to the fishing pole.

10. The fishing pole support apparatus of claim 8 wherein said legs are substantially elongate and are less than 14 inches in length.

11. The fishing pole support apparatus of claim 8 wherein said detachable connection of said legs to said body includes two threaded holes in said body, said legs each having an attachment end, said attachment ends being threaded so as to be selectively, threadably received in said respective threaded holes.

12. The fishing pole support apparatus of claim 1 wherein each of said legs comprise of a plurality of leg sections detachably attached to one another.

13. The fishing pole support apparatus of claim 12 further comprising thread means for selectively, detachably attaching said leg sections together.

14. The fishing pole support apparatus of claim 1 further comprising a cap received on each of said legs opposite the end whereat said legs are detachably attached to said body.

15. The fishing pole support apparatus of claim 1 wherein said second clamp means includes two clamps attached to said body, each of said clamps selectively supporting and holding one of said two legs.

16. The fishing pole support apparatus of claim 15 wherein each of said clamps includes two arms connected to said body and extending outwardly therefrom and forming a groove therebetween, said legs being selectively received in said grooves and frictionally retained therein with said arms.

17. The fishing pole support apparatus of claim 16 wherein said grooves and said legs retained therein are substantially parallel to the fishing pole attached to said body.

18. The fishing pole support apparatus of claim 1 wherein said second clamp means clamps and supports said legs substantially parallel to the fishing pole attached to said body.

19. The fishing pole support apparatus of claim 1 further comprising a fishing line guide insert having a ring portion attached to a rod, said rod being operative to be inserted and frictionally held in a bore at the end of the fishing pole, said ring being operative to receive therethrough and guide a fishing line.

20. A fishing pole support apparatus having an operative position and a storage position, said apparatus comprising:
   a body;
   first clamp means for attaching said body to a fishing pole;
   two legs detachably attached to said body, wherein when said legs are attached to said body, said apparatus is its operative position and said legs and the fishing pole form a tripod; and,
   second clamp means attached to said body for selectively clamping and supporting said legs on said body when said legs are detached from said body, said apparatus being in its storage position when said legs are clamped and supported on said body by said second clamp means.

21. The fishing pole support apparatus of claim 20 wherein said first clamp means includes a cover plate detachably fastened to said body, a channel being situated between said cover plate and said body wherein the fishing pole is received and is frictionally attached and retained.

22. The fishing pole support apparatus of claim 20 wherein said detachable connection of said legs to said body includes two threaded holes in said body, said legs each having an attachment end, said attachment ends being threaded so as to be selectively threadably received in said respective threaded holes.

23. The fishing pole support apparatus of claim 20 wherein said legs are detachably attached to said body at an angle less than 160 degrees from on another.

24. The fishing pole support apparatus of claim 22 wherein said legs are detachably attached to said body substantially perpendicular to the fishing pole attached to said body.

25. The fishing pole support apparatus of claim 20 wherein each of said legs comprise of a plurality of leg sections detachably attachable to one another.

26. The fishing pole support apparatus of claim 20 further comprising a cap received on each of said legs opposite the end whereat said legs are detachably attached to said body.

27. The fishing pole support apparatus of claim 20 wherein said second clamp means includes two clamps attached to said body, each of said clamps selectively supporting and holding one of said two legs, and wherein each of said clamps include two arms connected to said body extending outwardly therefrom and forming a groove therebetween, said legs being selectively received in said grooves and frictionally retained therein with said arms.

28. The fishing pole support apparatus of claim 20:
wherein said first clamp means includes a cover plate detachably fastened to said body, a channel being situated between said cover plate and said body wherein the fishing pole is received and is frictionally attached and retained;
wherein said legs are detachably attached to said body at an angle less than 160 degrees from one another; and,
wherein said second clamp means includes two clamps attached to said body, each of said clamps selectively supporting and holding one of said two legs, and wherein each of said clamps include two arms connected to said body extending outwardly therefrom and forming a groove therebetween, said legs being selectively received in said grooves and frictionally retained therein with said arms.

29. The fishing pole support apparatus of claim 20 further comprising a fishing line guide insert having a ring portion attached to a rod, said rod being operative to be inserted and frictionally held in a bore at the end of the fishing pole, said ring being operative to receive therethrough and guide a fishing line.

* * * * *